(12) United States Patent
Kodama

(10) Patent No.: US 9,576,227 B2
(45) Date of Patent: Feb. 21, 2017

(54) DOCUMENT PROCESSING APPARATUS, IMAGE FORMING APPARATUS, IMAGE FORMING SYSTEM, AND NON-TRANSITORY COMPUTER READABLE MEDIUM

(71) Applicant: FUJI XEROX CO., LTD., Tokyo (JP)

(72) Inventor: Mari Kodama, Kanagawa (JP)

(73) Assignee: Fuji Xerox Co., Ltd., Tokyo (JP)

(\*) Notice: Subject to any disclaimer, the term of this patent is extended or adjusted under 35 U.S.C. 154(b) by 0 days.

(21) Appl. No.: 14/625,774

(22) Filed: Feb. 19, 2015

(65) Prior Publication Data
US 2016/0078328 A1 Mar. 17, 2016

(30) Foreign Application Priority Data
Sep. 12, 2014 (JP) .............................. 2014-186470

(51) Int. Cl.
G06K 15/00 (2006.01)
G06K 15/02 (2006.01)

(52) U.S. Cl.
CPC ....... G06K 15/1848 (2013.01); G06K 15/1806 (2013.01); G06K 15/1822 (2013.01); *G06K 2215/0088* (2013.01)

(58) Field of Classification Search
USPC .............. 358/1.15, 436, 407, 434, 435, 474, 401,358/405, 530, 3.24
See application file for complete search history.

(56) References Cited

U.S. PATENT DOCUMENTS

| 2011/0043863 A1* | 2/2011 | Saka ................ G03G 15/04018 358/3.24 |
| 2012/0169004 A1* | 7/2012 | Keil ......................... B43M 3/04 270/58.01 |
| 2014/0064772 A1* | 3/2014 | Azami ................. G03G 15/234 399/79 |
| 2015/0268907 A1* | 9/2015 | Ishijima ................ G06F 3/1247 358/1.15 |

FOREIGN PATENT DOCUMENTS

JP 2013-193395 9/2013

OTHER PUBLICATIONS

Abstract and machine translation of JP 2013-193395.

\* cited by examiner

*Primary Examiner* — Jerome Grant, II
(74) *Attorney, Agent, or Firm* — Fildes & Outland, P.C.

(57) ABSTRACT

A document processing apparatus includes: a reception unit that receives a designation of cover pages of an electronic document having the cover pages and document body pages; and an instruction unit that gives an instruction to respectively print the cover pages and the document body pages on the basis of the designation received by the reception unit.

15 Claims, 14 Drawing Sheets

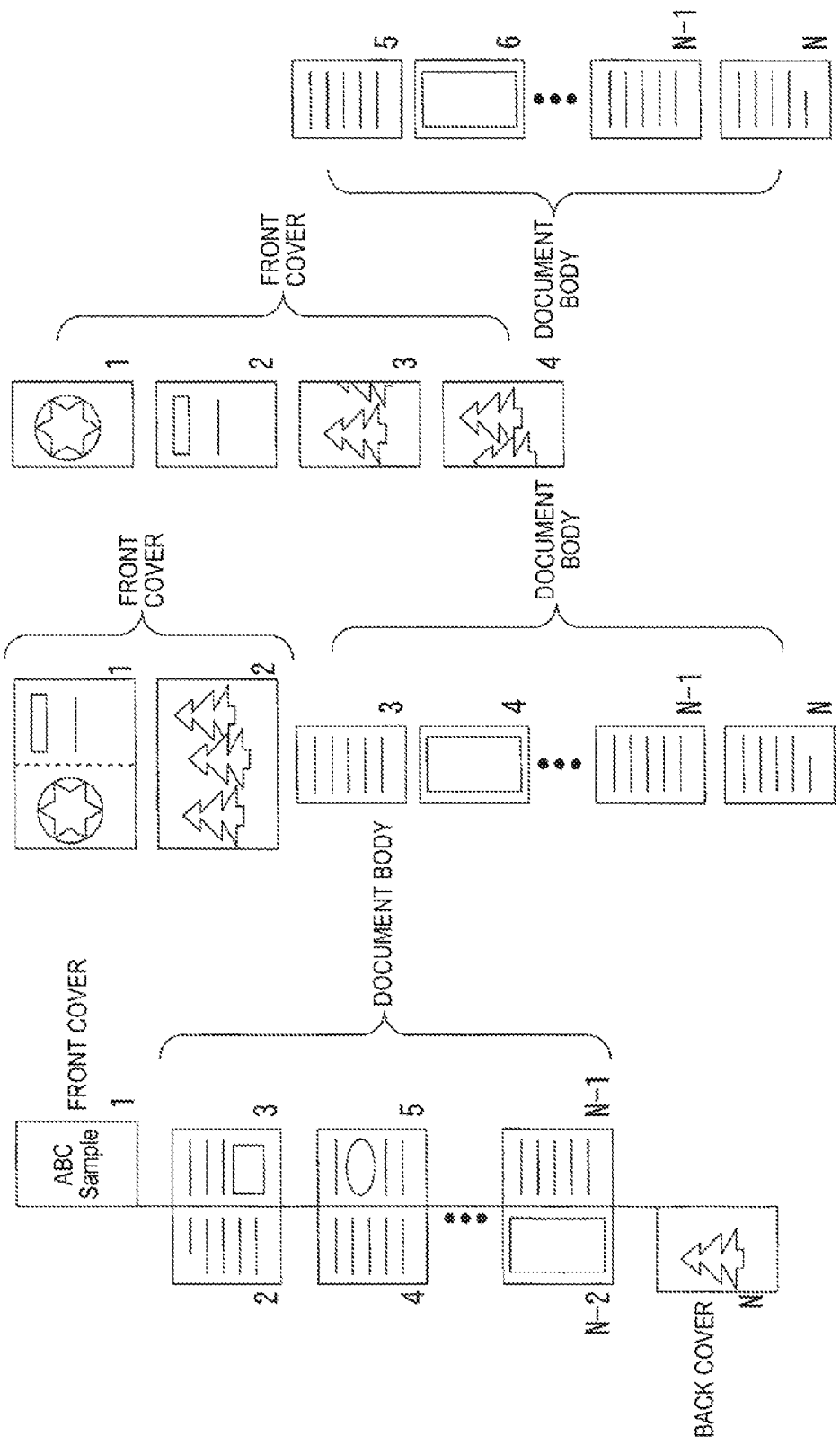

DOCUMENT PROCESSING APPARATUS, IMAGE FORMING APPARATUS, IMAGE FORMING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-186470 filed on Sep. 12, 2014.

BACKGROUND

Technical Field

The present invention relates to a document processing apparatus, an image forming apparatus, an image forming system, and a non-transitory computer readable medium.

SUMMARY

An aspect of the present invention provides a document processing apparatus including: a reception unit that receives a designation of cover pages of an electronic document having the cover pages and document body pages; and an instruction unit that gives an instruction to respectively print the cover pages and the document body pages on the basis of the designation received by the reception unit.

BRIEF DESCRIPTION OF THE DRAWINGS

Exemplary embodiment(s) of the present invention will be described in detail based on the following figures, wherein

FIGS. 2A to 2C are examples of print data used in the image forming system;

DETAILED DESCRIPTION

Hereinafter, an embodiment for implementing the present invention will be described with reference to the drawings. While the following embodiment illustrates a document processing apparatus, an image forming apparatus, an image forming system, and a document process program for implementing the technical spirit of the present invention, the embodiment is not intended to limit the present invention, and may be equally applied to other embodiments included in the claims.

Figure 1:
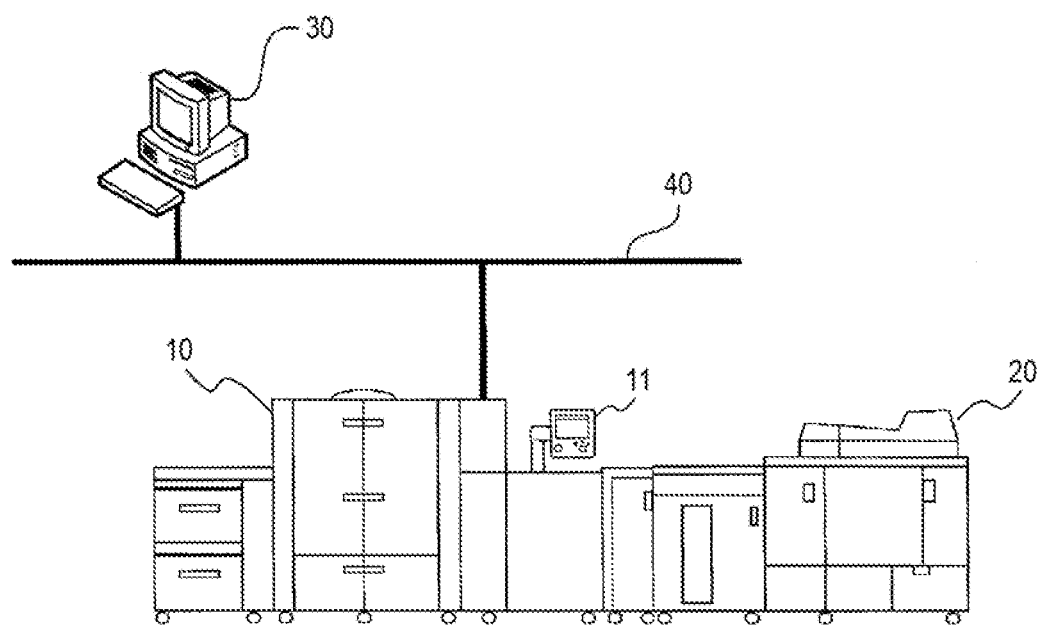
FIG. 1 is a diagram showing the system configuration of an image forming system according to an embodiment of the present invention.

FIG. 1 is a block diagram showing the configuration of an image forming system according to an embodiment of the present invention.

As shown in FIG. 1, the image forming system using a document processing program according to an embodiment of the present invention includes an image forming apparatus 10, a binding apparatus 20, and a terminal device 30 that are connected to one another via a network 40. The terminal device 30 generates print data, and transmits the generated print data to the image farming apparatus 10 via the network 40. The image forming apparatus 10 receives the print data transmitted from the terminal device 30, and outputs an image corresponding to the print data on a sheet. The image forming apparatus 10 is an apparatus called a so-called multifunction machine that has a plurality of functions such as a print function, a scan function, a copy function, and a facsimile function. The binding apparatus 20 is an apparatus called a so-called case binding machine that performs case binding in which a document body is covered with a cover printed by the image forming apparatus 10 to make one book.

FIGS. 2A to 2C show examples of electronic documents which are the print data transmitted from the terminal device 30. Cover pages and document body pages are present in the print data. The print data of FIG. 2A is configured such that a first page is a cover page for a front cover, a final page which is an N-th page is a cover page for a back cover, and a second page to an (N−1)-th page are document body pages. The print data of FIG. 2B is configured such that a first page and a second page are a cover page of page spread and a cover page which becomes a back side of page spread and a third page to an N-th page are document body pages. The print data of FIG. 2C is configured such that the cover pages of FIG. 2B are not the cover pages of page spread but four cover pages which are data obtained by respectively having the cover pages and a fifth page to an N-th page are document body pages.

Figure 3B:
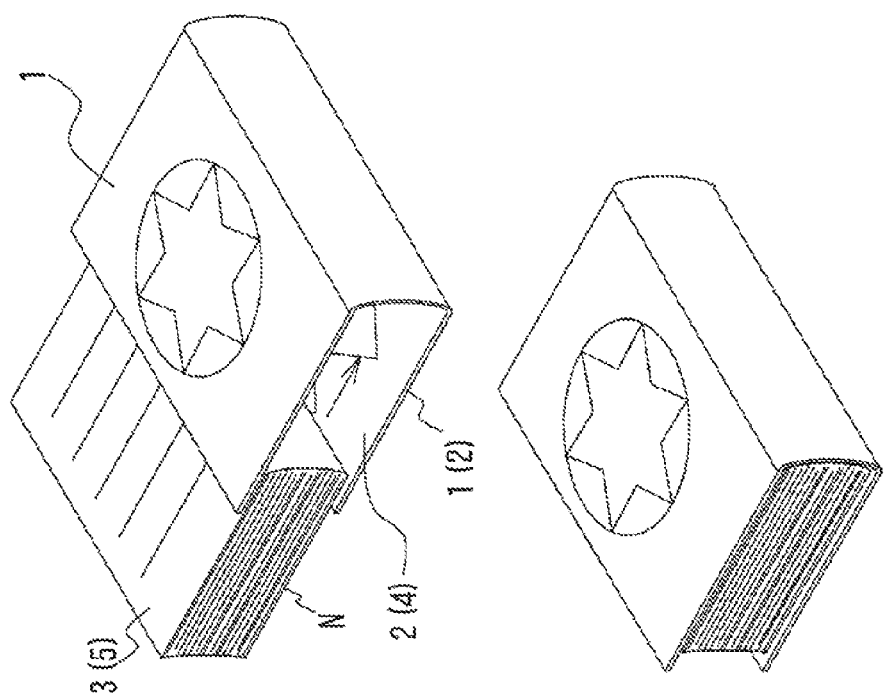
FIG. 3B is a schematic diagram when case binding is performed using the print data of FIGS. 2B and 2C.
Figure 3A:
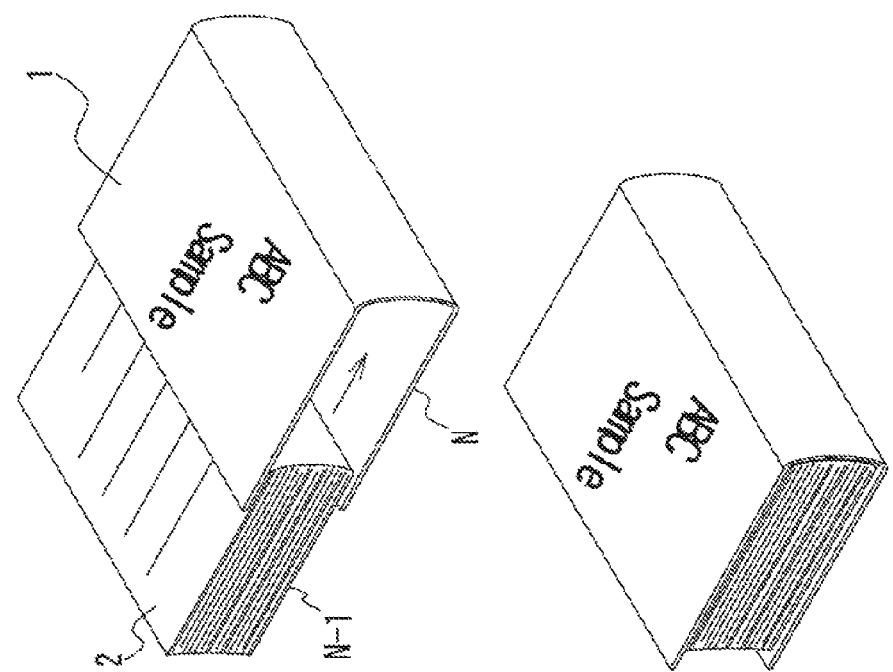
FIG. 3A is a schematic diagram when case binding is performed using the print data of FIG. 2A.

These print data are transmitted from the terminal device 30, and are printed by the image forming apparatus 10. Here, the print data of FIG. 2A and the print data of FIGS. 2B and 2C are respectively bound by the binding apparatus 20 as shown in FIG. 3A and FIG. 3B.

Although it has been described in FIGS. 2A to 2C that the cover pages and the document body pages are present in the print data, the print data of the cover pages and the print data of the document body pages may be separately provided. Also in this case, the print data are respectively transmitted from the terminal device 30, are printed by the image forming apparatus 10, and then are bound by the binding apparatus 20.

Figure 4:
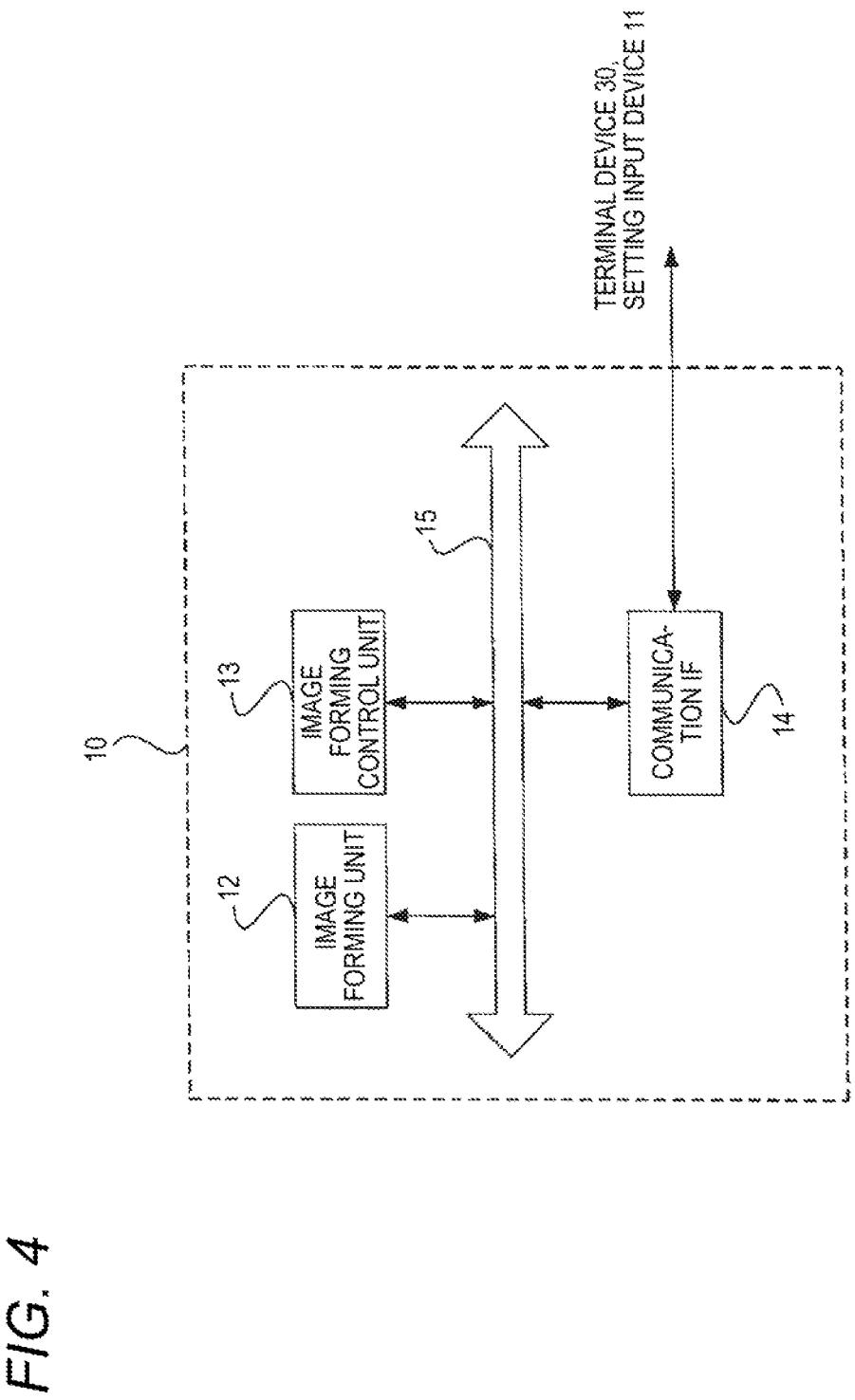
FIG. 4 is a block diagram showing the functional configuration of an image forming apparatus 10.

The hardware configuration of the image forming apparatus 10 in the image forming system according to the present embodiment is shown in FIG. 4.

As shown in FIG. 4, the image forming apparatus 10 includes an image forming unit 12, an image forming control unit 13, and a communication interface (IF) 14 that transmits and receives data to and from the terminal device 30 and a setting input device 11 to be described below. These components are connected to one another through a control bus 15.

The image forming unit 12 forms an image of the print data received from the terminal device 30. The image forming unit 12 is controlled by the image forming control unit 13.

Figure 5:
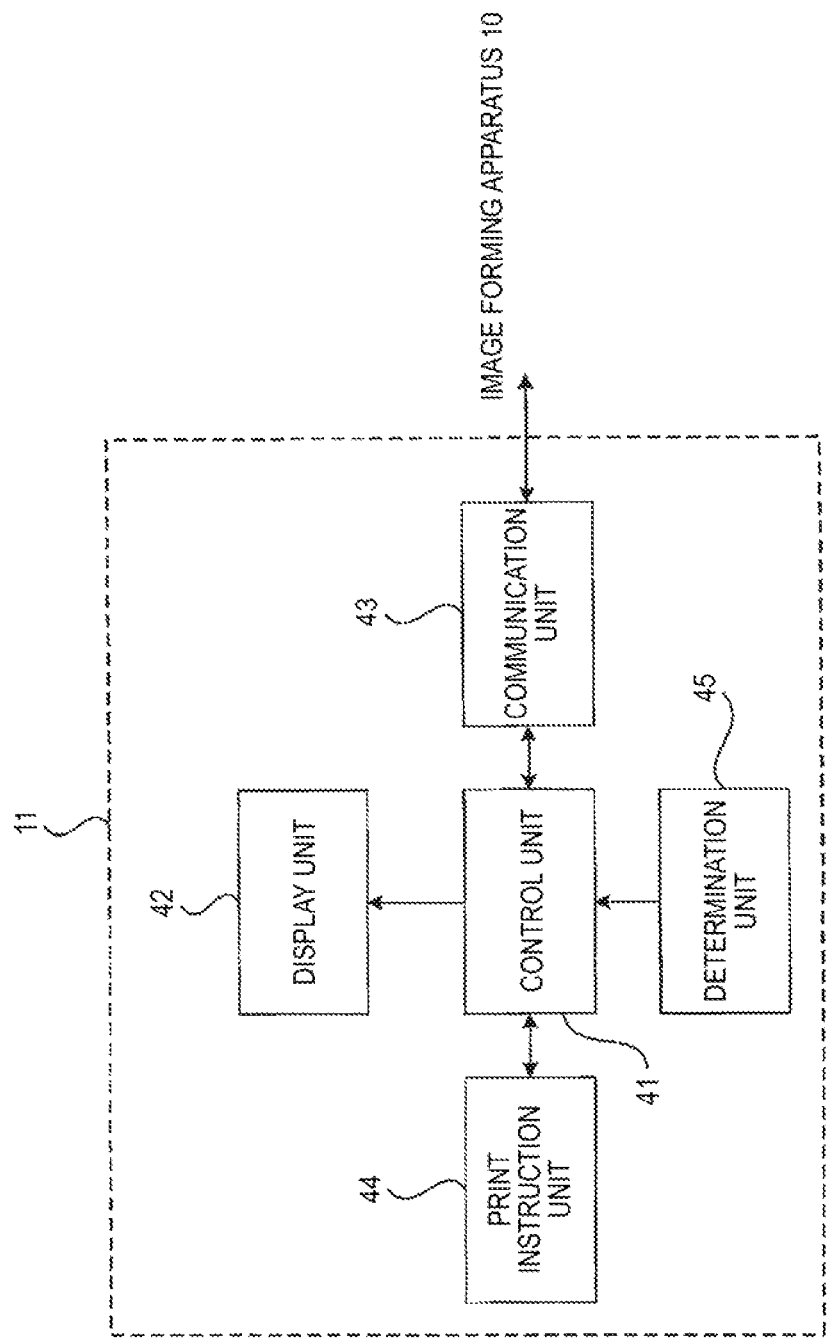
FIG. 5 is a block diagram showing the functional configuration of a setting input device 11.
Figure 6A:
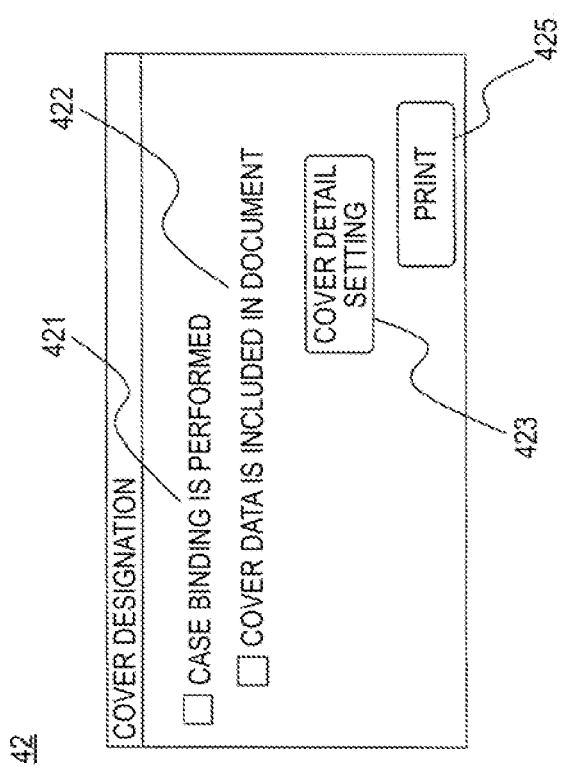
FIGS. 6A and 6B show an example of a display screen on a display unit 42.
Figure 6B:
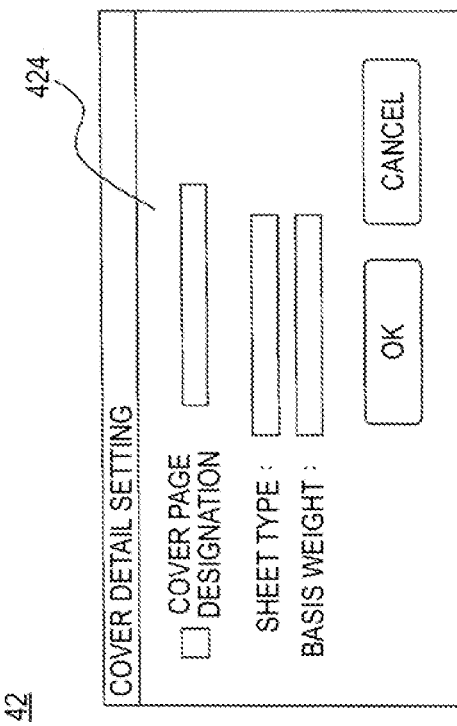

The image forming apparatus 10 includes the setting input device 11 that receives a designation of the cover pages of the print data including the cover pages and the document body pages. FIG. 5 is a block diagram showing the functional configuration of the setting input device 11, and FIGS. 6A and 6B are enlarged views of the setting input device 11 in FIG. 1 and shows examples of a screen displayed on a display unit 42.

As shown in FIG. 5, the setting input device 11 of the present embodiment includes a control unit 41, the display unit 42, a communication unit 43, a print instruction unit 44, and a determination unit 45.

The control unit 41 performs displaying on the display unit 42, communication through the communication unit 43, and controlling of the print instruction unit 44 and the determination unit 45.

The display unit 42 displays information required to designate the cover pages to a user. Here, the details of the display unit 42 will be described with reference to FIGS. 6A and 6B.

A binding necessity checking section 421, a cover page checking section 422, a cover page detail setting section 423, a cover page designating section 424, and a print starting section 425 are displayed on the display unit 42.

The binding necessity checking section 421 checks whether or not binding is necessary. The cover page checking section 422 checks whether or not the cover pages are included in the print data transmitted from the terminal device 30. These sections include checkboxes, and when the binding is necessary, a user of the image forming apparatus 10 puts a check in the binding necessity checking section 421. Thereafter, when the cover pages are included in the print data, the user puts a check in the cover page checking section 422.

The cover page detail setting section 423 changes a screen displayed on the display unit 42 from FIG. 6A to FIG. 6B which is a screen for setting the details of the cover pages.

The cover page designating section 424 is displayed after the screen displayed on the display unit 42 by the cover page detail setting section 423 is changed to FIG. 6B, and designates which pages within the print data are appropriate for the cover pages. For example, in the case of the print data of FIG. 2A, the user of the image forming apparatus 10 inputs I and N in a text box field on a left side of "cover page designation". The type or basis weight of a sheet used as the cover may be designated.

These pages may not be designated in the cover page designating section 424 by the user, and when the cover page checking section 422 checks that the cover pages are present within the print data, data having a large sheet size within the print data may be determined as the cover pages, and the determined data may be printed.

The print starting section 425 allows the user of the image forming apparatus 10 to start to print the print data transmitted from the terminal device 30.

The communication unit 43 receives the print data from the terminal device 30, or transmits an instruction to print the print data to the image forming apparatus 10.

The print instruction unit 44 initially gives an instruction to print the cover pages designated by the cover page designating section 424, and subsequently gives an instruction to print the document body pages.

The determination unit 45 determines whether or not the format of the cover pages designated in the cover page designating section 424 is appropriate for the document body pages. Specifically, the determination unit determines whether or not a sheet size of the cover pages is greater than that of the document body pages, or compares quality of sheets used for the cover pages with quality of sheets used for the document body.

When the cover panes are designated by the setting input device 11 and the print instruction is given, a print order of the print data transmitted from the terminal device 30 is changed, and data of the cover are initially printed. Subsequently, data of the document body are printed. A Cover which is a cover on which the cover pages are printed are discharged to a cover sheet tray (not shown) of the image forming apparatus 10.

The cover discharged to the cover sheet tray is mounted on a binding cover sheet tray 21 of the binding apparatus 20 to be described below, and document body sheets which are sheets on which the document body pages are printed are mounted on a binding text tray 22 of the binding apparatus 20 also to be described below. Thereafter, binding is started.

Figure 7:
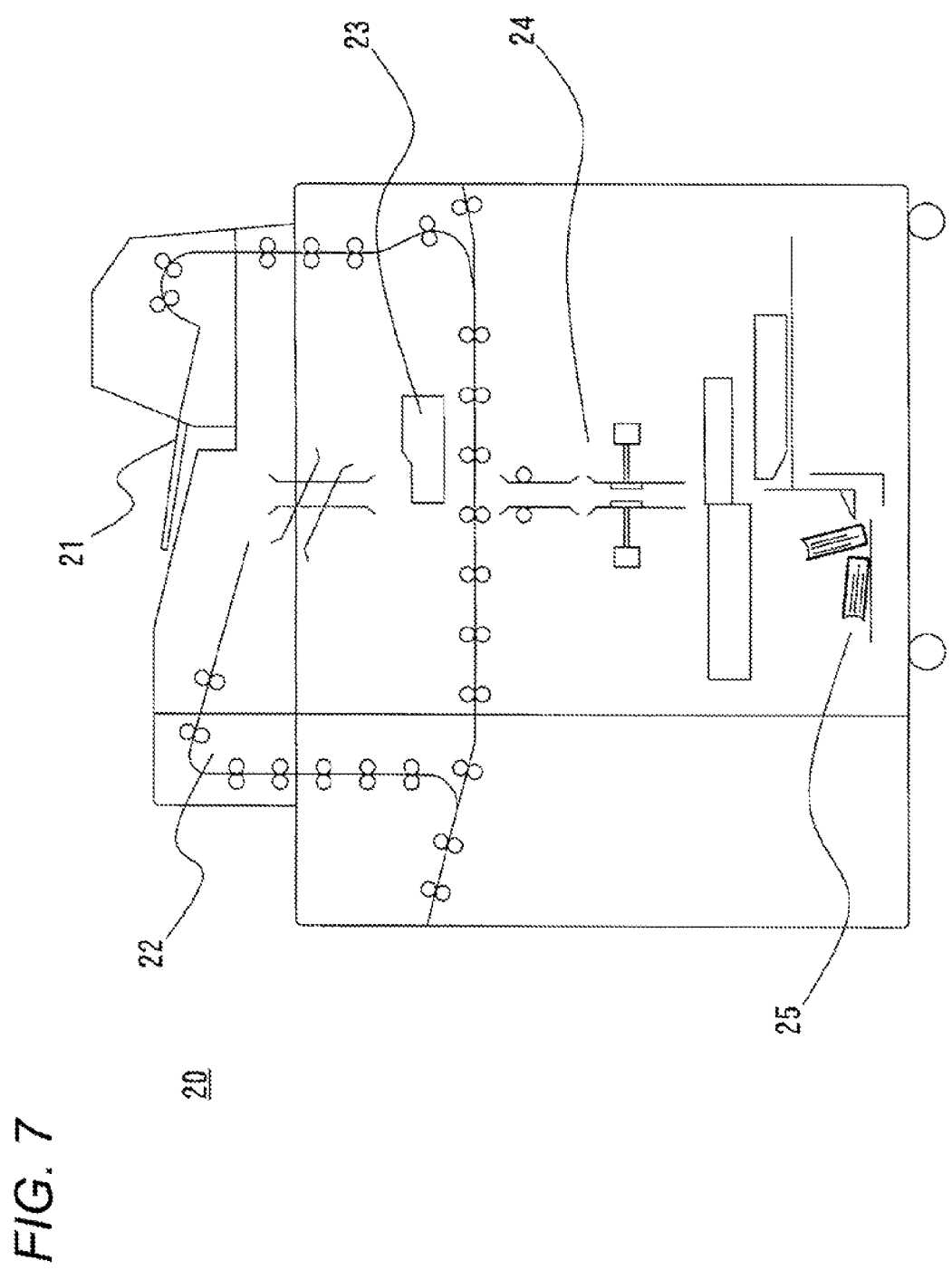
FIG. 7 is a diagram showing the configuration of a binding apparatus 20.

The internal configuration of the binding apparatus 20 in the image forming system according to the present embodiment is illustrated in FIG. 7. The binding apparatus 20 is an apparatus that performs case binding, and includes the binding cover sheet tray 21, the binding text tray 22, an attaching unit 23, a cutting unit 24, and a loading tray 25.

The binding cover sheet tray 21 is a tray on which the cover printed by the image forming apparatus 10 is mounted, and the binding text tray 22 is a tray on which the document body sheets printed by the image forming apparatus 10 are mounted.

The cover and the document body sheets are respectively mourned on the binding cover sheet tray 21 and the binding text tray 22, and the case binding is started by transmitting a signal from the terminal device 30 or pressing a start button (not shown) provided at the binding apparatus 20. The cover mounted on the binding cover sheet tray 21 is sent to the attaching unit 23 within the binding apparatus, and the document body sheets mounted on the binding text tray 22 are sent to a position corresponding to the spine of the cover. Thus, these sheets are attached.

Thereafter, a group of the cover and the document body sheets that are integrated by being attached is sent to the cutting unit 24, and blank spaces thereof formed in other portions other than a spine cover direction are cut. Subsequently, a bound book is mounted on the loading tray 25, and the binding is finished.

Figure 8:
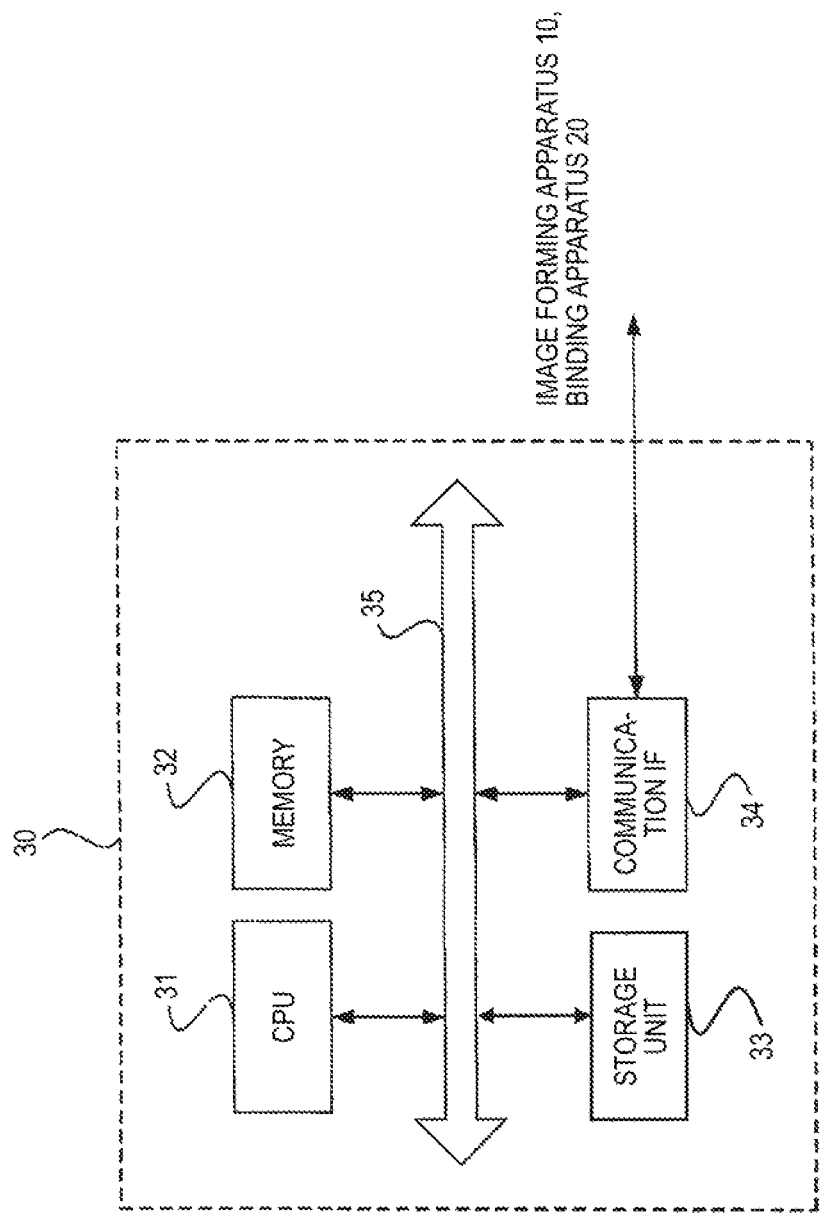
FIG. 8 is a block diagram showing the hardware configuration of a terminal device 30.

Next, the hardware configuration of the terminal device 30 in the image forming system according to the present embodiment is shown in FIG. 8.

As shown in FIG. 8, the terminal device 30 includes a CPU 31, a memory 32, a storage unit 33 such as a hard disk drive (HDD), and a communication interface (IF) 34 that transmits and receives data to and from the image forming apparatus 10 or the binding apparatus 20. These components are connected to one another through a control bus 35.

The CPU 31 controls the operation of the terminal device 30 by executing a predetermined process on the basis of a control program stored in the memory 32 or the storage unit 33.

In the present embodiment, although it has been described that the CPU 31 reads the control program stored within the memory 32 or the storage unit 33 and executes the read control program, the program may be stored in a recording medium such as a CD-ROM, and may be provided to the CPU 31.

First Example

Figure 9:
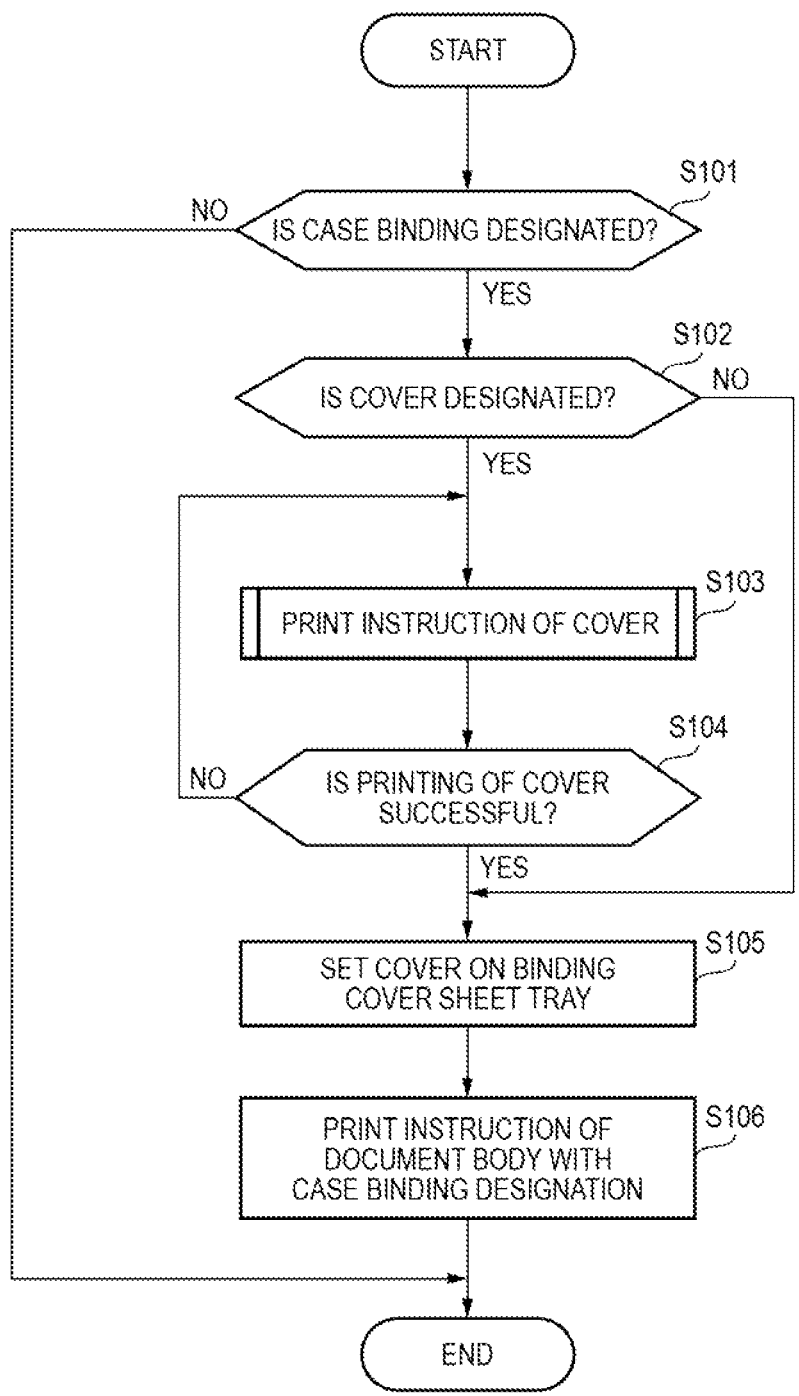
FIG. 9 is a flowchart for describing the entire operation when the case binding is performed in the image forming system.

A process in the image forming apparatus 10 when the case binding is performed using print data including cover pages and document body pages will be described with reference to a flowchart of FIG. 9.

Initially, it is checked whether or not the case binding is designated (step S101). When the printing is started without designating the case binding, this process is ended, and normal printing is performed.

In step S101, when the case binding is designated, it is checked whether or not the cover is designated (step S102). When the printing is started without designating the cover, this process proceeds to step S106 to be described below.

Figure 10:
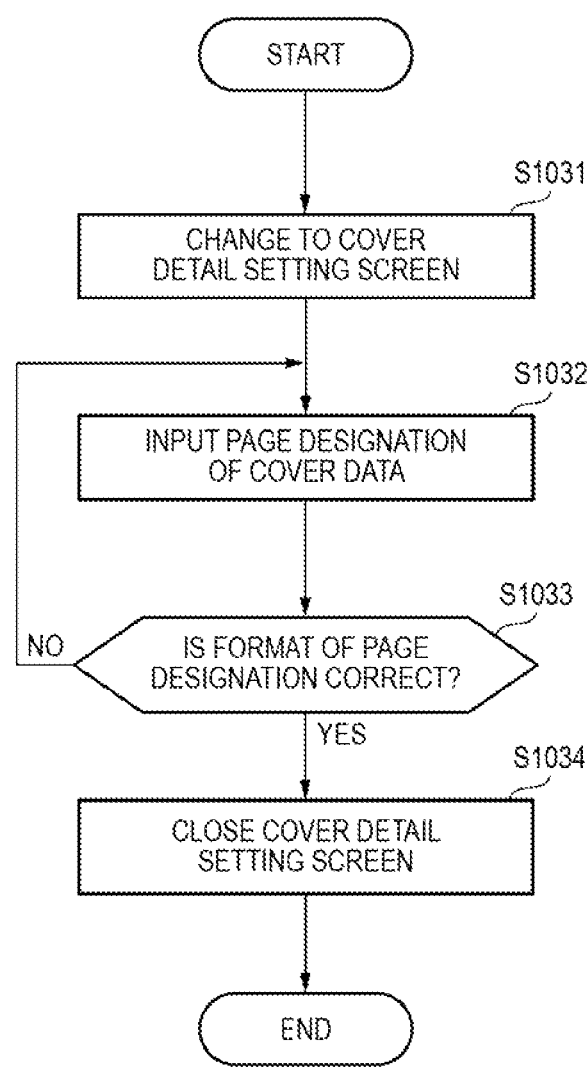
FIG. 10 is a flowchart for describing the details of a print instruction of a cover described in step S103 of the flowchart of FIG. 9.

In step S102, when the cover is designated, an instruction to print the cover is given by the print instruction unit 44 of the terminal device 30 (step S103). A detailed process of the print instruction of the cover will be described with reference to a flowchart of FIG. 10.

First, in order to set the details of the cover, a display of the setting input device 11 is changed to a cover detail setting screen as shown in FIG. 6B (step S1031).

Next, a cover page designation is input within the text box displayed on the setting input device 11 according to a determined format (step S1032).

It is determined whether or not the format of the page designation input in step S1032 is correct by the determination unit 45 of the terminal device 30 (step S1033). In general, since the cover of the book is required to cover a document body, the size of the cover is greater than the sheet size of the document body. Since it is necessary to protect the document body, sheets which are more rigid than the sheets of the document body are used as the sheet used for the cover. Thus, it is determined whether or not the format of the page designation is correct by comparing the sheet size or sheet quality of the input page of the page designation with the sheet size or sheet quality of other pages.

When it is determined that the format of the page designation is not correct in step S1033, this process returns to the input of the cover page designation again (step S1032), and when it is determined that the format of the page designation is correct, the cover detail setting screen is closed (step S1034), and the print instruction of the cover is ended.

When the print instruction of the cover (step S103) is ended, the printing of the cover is started, and it is checked whether or not the printing of the cover succeeds (step S104). When the printing of the cover succeeds, the printed cover is mounted on the binding cover sheet tray 21 (step S105). In contrast, when the printing of the cover fails, this process returns to step S103, and the print instruction of the cover is performed again.

When the cover is mounted on the binding cover sheet tray 21, the case binding designation and the printing of the document body pages are started by the print instruction unit 44 of the terminal device 30, and the case binding is performed using the cover and the document body (step S106), and the binding is finished.

Second Example

Next, another process in an image forming apparatus when the case binding is performed using print data including cover pages and document body pages will be described with reference to FIGS. 11 to 14.

Figure 11:
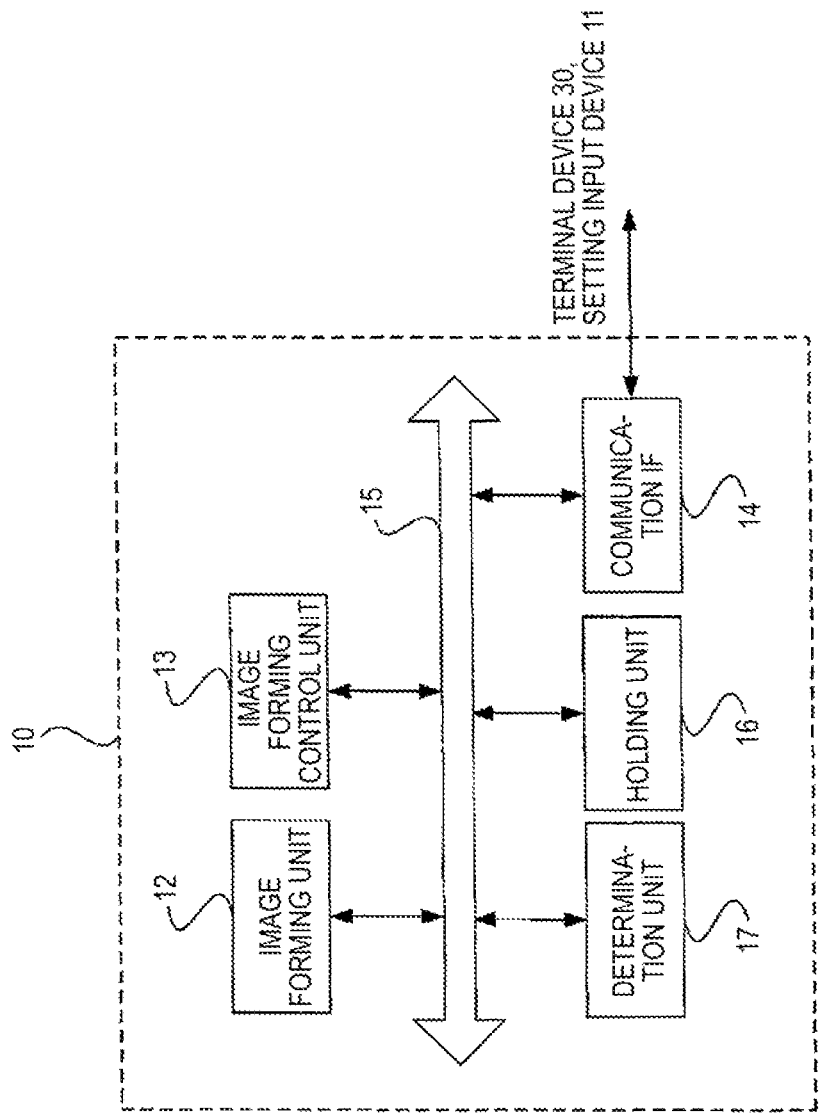
FIG. 11 is another block diagram showing the functional configuration of the image forming apparatus in the image forming system.
Figure 12:
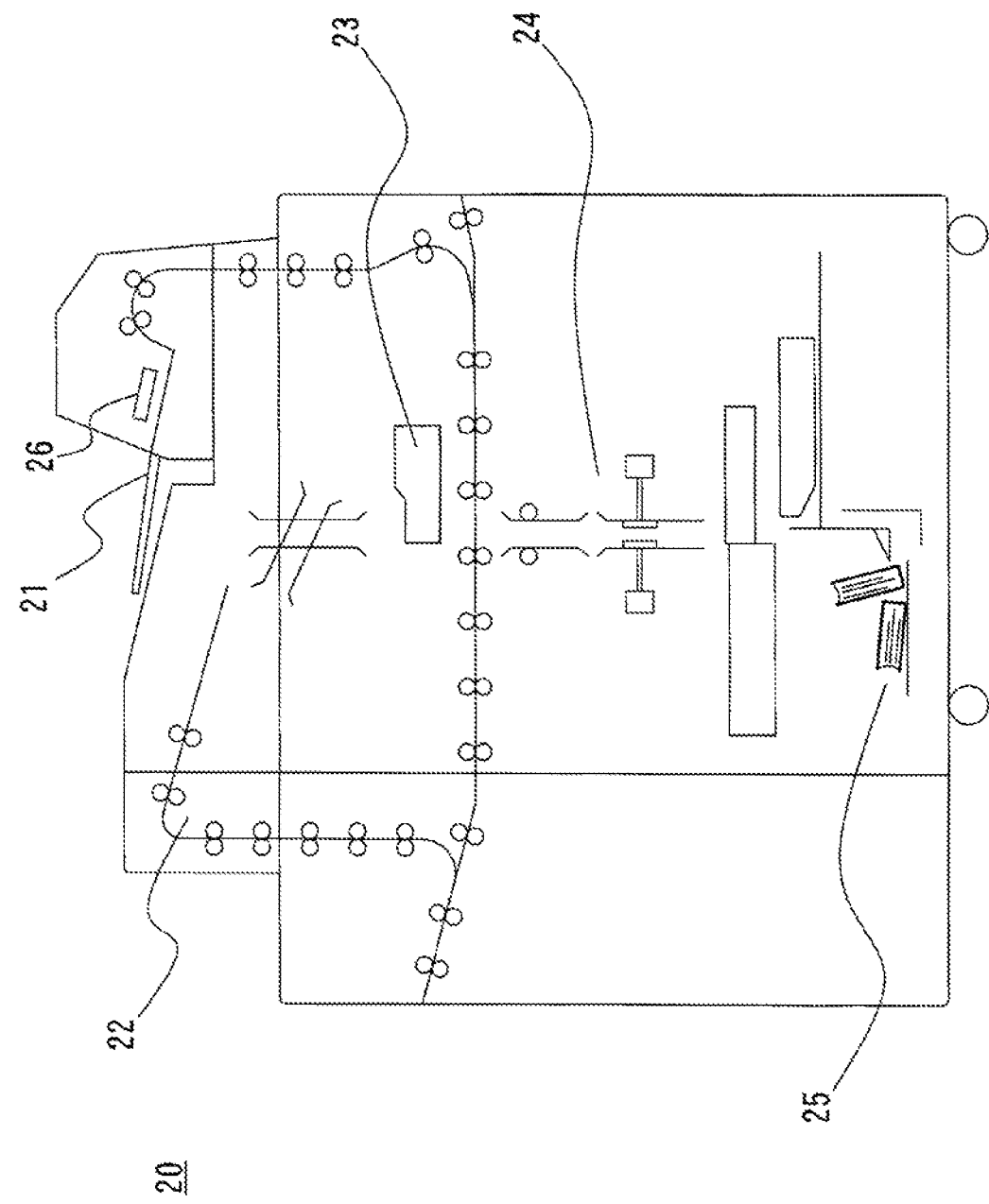
FIG. 12 is another diagram showing the configuration of the binding apparatus in the image forming system.
Figure 13:
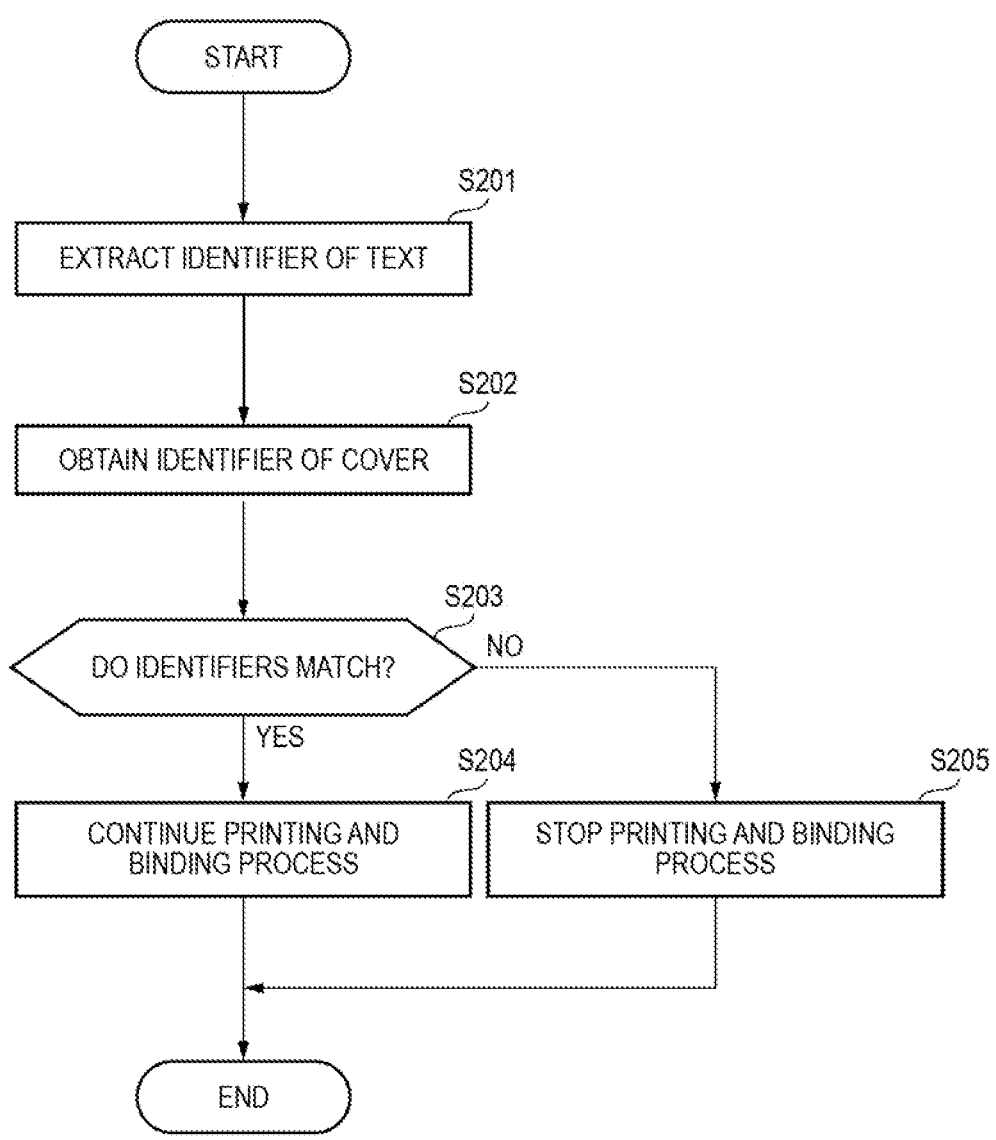
FIG. 13 is a flowchart for describing the details of an association process of a cover and a document body in the image forming system.
Figure 14:
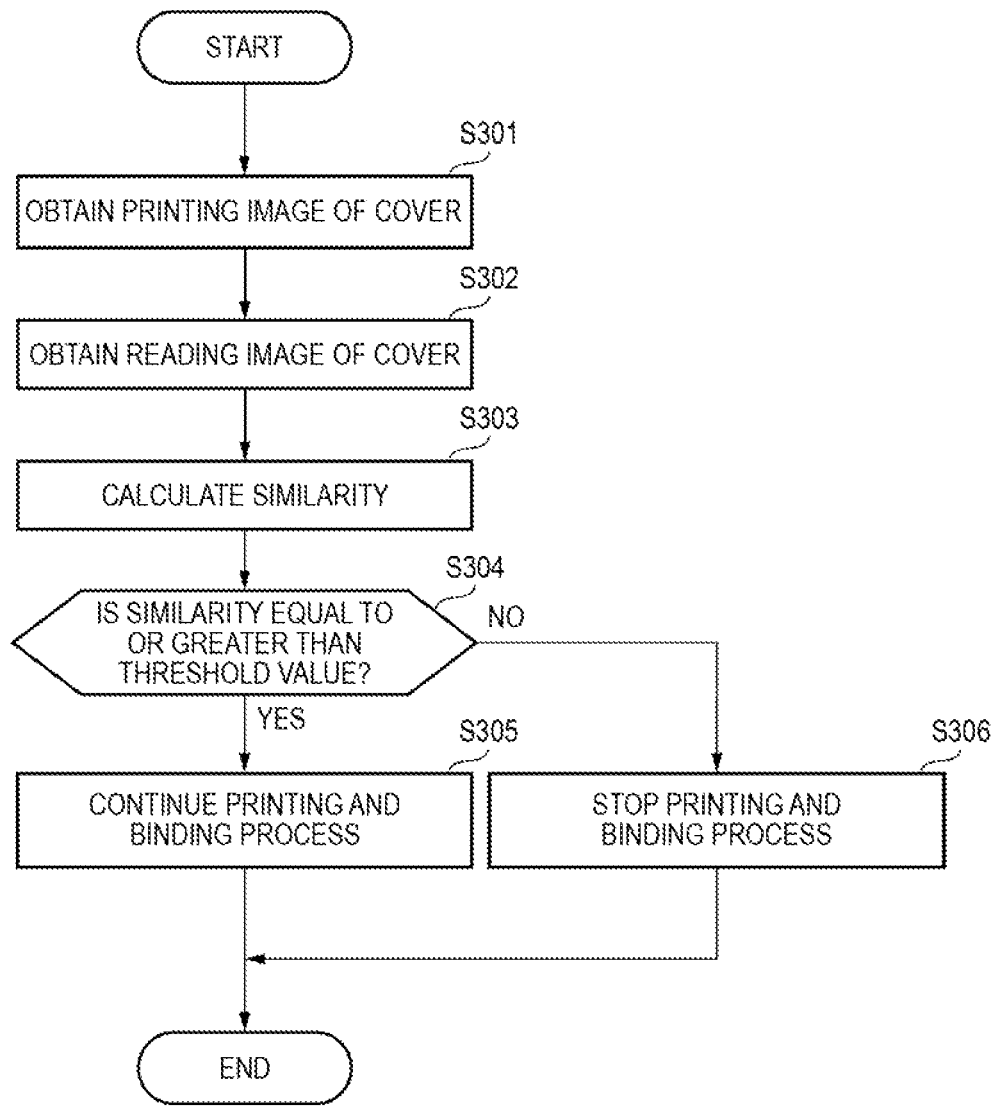
FIG. 14 is a flowchart for describing the details of another association process of the cover and the document body in the image forming system.

FIG. 11 is as diagram showing the configuration of an image forming apparatus according to a second example, FIG. 12 is a diagram showing the configuration of a binding apparatus according to the second example, FIG. 13 is a flowchart for describing a cover image reading process in the case binding according to the second example, and FIG. 14 is a flowchart for describing another cover image reading process in the case binding according to the second example. The same components as those in the first example will be assigned the same reference numerals, and the description thereof will be omitted.

In the second example, a binding process when the print data transmitted from the terminal device 30 are respectively transmitted as the cover pages and the document body pages will be described.

As shown in FIG. 11, the functional configuration of the image forming apparatus 10A includes a holding unit 17, and a determination unit 18, in addition to the functional configuration of the image forming apparatus 10 according to the first example.

The holding unit 17 holds association information which associates the cover pages with the document body pages of the print data received from the terminal device 30. The association information is an identifier for identifying the cover pages and the document body pages or an image using the print data, and has information that can determine that the cover pages and the document body pages of the print data to be printed correspond to each other.

As the identifier, an identifier of the print data, an identifier of the cover pages, or an identifier of the document both pages may be used, and hash values obtained by performing a process using a one-way function on these identifiers may be used. When the print data is a publication, the international standard book number (ISBN) assigned to the publication may be used as the identifier.

As the image using the print data, an image obtained by performing a conversion process required for a printing process on the print data may be used, or a preview image of the print data that can be recognized in the terminal device 30 may be used.

The determination unit 18 determines whether or not the printed cover is associated with the document body pages to be printed now by comparing the association information held in the holding unit 17 with identification information read by a cover reading unit 26 to be described below. As a determination result, when the cover is associated with the document body, the binding and the printing of the document body are continued, and when the cover is not associated with the document body, the printing of the document body is stopped.

As shown in FIG. 12, the binding apparatus 20A includes the cover reading unit 26 near a sheet feed opening of the binding cover sheet tray 21, in addition to the configuration of the binding apparatus 20 according to the first example. The cover reading unit 26 reads the cover fed from the binding cover sheet tray 21 optically or magnetically, and obtains identification information from the cover. The cover reading unit 26 may be provided at the sheet teed opening of the binding cover sheet tray 21 or on the binding cover sheet tray 21 as long as the cover page reading unit is provided at a position that can read the cover as a target of the binding. Plural cover reading unit 26 may be provided in order to simultaneously read the front surface and the back surface of the cover.

The identification information is used to identify whether or not the printed cover is associated with the document body pages to be printed now by using the association information held in the holding unit 17 of the image forming apparatus 10A. The identification information is an identification code including information on the identifier or reading images of the cover pages.

The cover reading process in the binding apparatus 20 according to the second example will be described in detail with reference to a flowchart of FIG. 13.

When the cover is mounted on the binding cover sheet tray 21 in step S105, the image forming apparatus 10A obtains an identifier which is information on a document to be subjected to the binding from the terminal device 30 (step S201).

The print data of the cover transmitted from the terminal device 30 and the identification code including the aforementioned identification information are printed on the cover printed by the image forming apparatus 10A by the image forming apparatus 10A. The identification code is a code that can be read by a reader of a barcode or a QR code (registered trademark). The printing may be performed on the front surface or the back surface of the cover as long as the printing is performed on a position that can be read by the cover reading unit 26. The identification code may be printed with visible ink or toner, may be printed with non-visible ink or toner that emits by reacting to infrared rays, or may be printed with transparent magnetic ink.

Next, the binding apparatus 20A sends the cover mounted on the binding cover sheet tray 21, and obtains the identification code printed on the cover by the cover reading unit 26 (step S202). The determination unit 18 of the image forming apparatus 10A compares the identifier of the document to be subjected to the binding with the identifier obtained by the identification code obtained from the cover, and determines whether or not the cover is associated with the text (document body) (step S203).

When these identifiers match each other, it is determined that the cover is associated with the text, and the printing of the text and binding process are continued (step S204). When these identifiers do not match each other, it is determined that the cover is not associated with the text, and the printing of the text and the binding process are stopped (step S205).

When the printing of the text and the binding process are stopped in step S205, a warning sound may be output, or the intent that the printing and the binding process are stopped may be displayed on the display unit 42.

Next, another cover reading process in the binding apparatus 20A according to the second example will be described in detail with reference to a flowchart of FIG. 14.

When the cover is mounted on the binding cover sheet tray 21 in step S105, the image forming apparatus 10A obtains priming images of the cover of the document to be subjected to the binding from the terminal device 30 (step S301). The printing image of the cover is an image obtained by performing a conversion process required for a printing process on the print data or a preview image of the print data that can be recognized by the terminal device 30.

Next, the binding apparatus 20A sends the cover mounted on the binding cover sheet tray 21, and obtains reading images of the cover by the cover reading unit 26 (step S302). The determination unit 18 of the image forming apparatus 10A calculates similarity between the printing images of the cover and the reading images of the cover (step S303). Similarity calculated by a known image comparison technique such as a histogram extraction method or a key point matching method is used for the image comparison.

The determination unit 18 of the image forming apparatus 10A compares the similarity calculated in step S303 with a predetermined threshold value (step S304), and when the similarity is equal to or greater than the threshold value, it is determined that the cover is associated with the text, and the printing of the text and the binding process are continued (step S305). When the similarity is less than the threshold value, it is determined that the cover is not associated with the text, and the printing of the text and the binding process are stopped (step S306).

Although the case binding has been described in the present embodiment, the binding may be performed by other binding processes such as stitched binding, saddle-stitched binding and ring binding as well as the case binding through a series of manipulations.

The program of the present invention may be provided by being stored in the recording medium, or the program may be provided through communication means. In this case, for example, the above-described program may be understood as the invention of "computer-readable recording medium storing a program".

The "computer-readable recording medium storing a program" refers to a computer-readable recording medium storing a program, which is used for installing, executing, and distributing the program.

Examples of the recording medium include "DVD-R, DVD-RW, DVD-RAM, and the like" which are digital versatile discs (DVDs) and standards proposed in the DVD Forum. "DVD+R, DVD+RW, and the like" which are standards proposed in the DVD+RW compact discs (CDs) including read only memory (CD-ROM), CD-recordable (CD-R), and CD-rewritable (CD-WR), and the like, Bin-ray Disc (registered trademark), magneto-optic disk (MO), flexible disk (FD), magnetic tape, hard disk, read only memory (ROM), electrically erasable programmable read-only memory (EEPROM (registered trademark)), flash memory, random access memory (RAM), secure digital (SD) memory card and the like.

The aforementioned program or a part thereof may be stored or circulated by being stored in the recording medium. The aforementioned program or a part thereof may be transmitted through communication, for example, a wired network or a wireless communication network which is used in such as a local area network (LAN), a metropolitan area network (MAN), a wide area network (WAN), the internet, an intranet and an extranet, may be transmitted by using a transmission medium as a combination of the aforementioned media, or may be transmitted by being carried on carrier waves.

The aforementioned program may be a part of another program, or may be recorded in the recording medium together with separate programs. Further, the aforementioned program may be recorded in a plurality of recording media by being divided. The aforementioned program may be recorded in various forms as long as the program can be compressed, coded, and restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document processing apparatus comprising:
a designation unit that designates print data that is to be printed on sheets for cover pages of an electronic document having the data that is to be printed on a sheet for cover pages and data that is to be printed on sheets for document body pages, the print data constituting a pregenerated plurality of pages transmitted from a device;
an instruction unit that gives an instruction to respectively print the data that is to be printed on sheets for cover pages and the data that is to be printed on sheets for document body pages based on the designation by the designation unit; and
an input unit via which print setting information is input by a user,
wherein the designation unit designates the data that is to be printed on a sheet for cover pages based on input of page numbers for the cover pages by a user via the input unit.

2. The document processing apparatus according to claim 1, wherein
the designation unit designates print data that is to be printed on sheets for the cover pages for a front cover and a back cover, respectively,
the instruction unit gives the instruction to respectively print the cover page for the front cover, the cover page for the back cover and the document body pages on the basis of the designation designated by the designation unit.

3. A document processing apparatus comprising:
a designation unit that designates data that is to be printed on sheets for cover pages of an electronic document having the data that is to be printed on a sheet for cover pages and data that is to be printed on sheets for document body pages;
an instruction unit that gives an instruction to respectively print the data that is to be printed on sheets for cover pages and the data that is to be printed on sheets for document body pages based on the designation by the designation unit;
an input unit via which print setting information is input by a user;
the designation unit designating the data that is to be printed on a sheet for cover pages based on input by a user via the input unit;
a holding unit that holds association information indicating association between the cover pages and the document body pages input via the input unit;
a reading unit that reads identification information from a cover printed using the cover pages; and
a determination unit that determines whether or not the document body pages are associated with the cover by comparing the association information with the identification information,
wherein the determination unit controls such that printing is performed in response to the document body pages being associated with the cover.

4. An image forming apparatus comprising:
a designation unit that designates print data that is to be printed on sheets for cover pages of an electronic document including the data that is to be printed on a sheet for cover pages and data that is to be printed on sheets for document body pages, the print data constituting a pregenerated plurality of pages transmitted from a device;
an instruction unit that gives an instruction to respectively print the data that is to be printed on sheets for cover pages and the data that is to be printed on sheets for document body pages based on the designation by the designation unit;
an input unit via which print setting information is input by a user, wherein the designation unit designates the data that is to be printed on a sheet for cover pages based on input of page numbers for the cover pages by a user via the input unit; and
a printing unit that respectively prints the sheets for cover pages and the sheets for document body pages on the basis of the instruction from the instruction unit.

5. The image forming apparatus according to claim 4, wherein the designation unit is a setting input device.

6. An image forming system comprising:
a designation unit that designates print data that is to be printed on sheets for cover pages of an electronic document including the data that is to be printed on a sheet for cover pages and data that is to be printed on sheets for document body pages, the print data constituting a pregenerated plurality of pages transmitted from a device;
an instruction unit that gives an instruction to respectively print the data that is to be printed on sheets for cover pages and the data that is to be printed on sheets for document body pages based on the designation by the designation unit;
an input unit via which print setting information is input by a user, wherein the designation unit designates the data that is to be printed on a sheet for cover pages based on input of page numbers for the cover pages by a user via the input unit;
a printing unit that respectively prints the sheets for cover pages and the sheets for document body pages on the basis of the instruction from the instruction unit; and
a binding unit that binds a cover printed using the sheets for cover pages and a document body printed using the sheets for document body pages.

7. The image forming system according to claim 6, wherein
the binding unit performs binding such that the document body are covered with the cover.

8. The image forming system according to claim 6, wherein
the designation unit designates print data that is to be printed on sheets for the cover pages for a front cover and a back cover, respectively,
the instruction unit gives the instruction to respectively print the cover page for the front cover, the cover page for the back cover and the document body pages on the basis of the designation designated by the designation unit.

9. The image forming system according to claim 6, wherein the designation unit is a setting input device.

10. A non-transitory computer readable medium storing a program causing a computer to execute a process for document processing, the process comprising:
   designating print data that is to be printed on sheets for cover pages of an electronic document having the data that is to be printed on a sheet for cover pages and data that is to be printed on sheets for document body pages, the print data constituting a pregenerated plurality of pages transmitted from a device;
   inputting print setting information by a user, wherein the designation of the data that is to be printed on a sheet for cover pages is based on input of page numbers for the cover pages by a user; and
   giving an instruction to respectively print the data that is to be printed on sheets for cover pages and the data that is to be printed on sheets for document body pages based on the designation.

11. An image forming system comprising:
   a designation unit that designates print data that is to be printed on sheets for cover pages of an electronic document including the data that is to be printed on a sheet for cover pages and data that is to be printed on sheets for document body pages, the print data constituting a pregenerated plurality of pages transmitted from a device;
   an instruction unit that gives an instruction to respectively print the data that is to be printed on sheets for cover pages and the data that is to be printed on sheets for document body pages based on the designation by the designation unit;
   an input unit via which print setting information is input by a user, wherein the designation unit designates the data that is to be printed on a sheet for cover pages based on input of page numbers for the cover pages by a user via the input unit;
   a printing unit that respectively prints, on the basis of the instruction from the instruction unit, the sheets for cover pages on first sheets and the sheets for document body pages on second sheets being different in size from the first sheets; and
   a binding unit that performs case binding in which a document body printed using the sheets for document body pages is covered with a cover printed using the sheets for cover pages.

12. The image forming system according to claim 11, wherein
   the designation unit designates print data that is to be printed on sheets for the cover pages for a front cover and a back cover, respectively,
   the instruction unit gives the instruction to respectively print the cover page for the front cover, the cover page for the back cover and the document body pages on the basis of the designation designated by the designation unit.

13. The image forming system according to claim 6, wherein the designation unit is a setting input device.

14. A document processing apparatus comprising:
   a designation unit that designates print data that is to be printed on sheets for cover pages of an electronic document having the data that is to be printed on a sheet for cover pages and data that is to be printed on sheets for document body pages, the print data constituting a pregenerated plurality of pages transmitted from a device; and
   an instruction unit that gives an instruction to respectively print the data that is to be printed on sheets for cover pages and the data that is to be printed on sheets for document body pages based on the designation by the designation unit,
   wherein the designation unit designates the data that is to be printed on a sheet for cover pages based on a sheet size within the electronic document.

15. The image forming system according to claim 14, wherein
   the designation unit designates data of a page having a large sheet size within the electronic document as the data that is to be printed on sheets for cover pages.

* * * * *